United States Patent [19]
Andersen

[11] Patent Number: 5,707,668
[45] Date of Patent: Jan. 13, 1998

[54] PROCESS OF PREPARING A SPREAD

[75] Inventor: Lars Peter Andersen, Klampenborg, Denmark

[73] Assignee: Novo Nordisk A/S, Bagsvaerd, Denmark

[21] Appl. No.: 776,935

[22] PCT Filed: Sep. 15, 1995

[86] PCT No.: PCT/DK95/00370

§ 371 Date: Feb. 12, 1997

§ 102(e) Date: Feb. 12, 1997

[87] PCT Pub. No.: WO96/08156

PCT Pub. Date: Mar. 21, 1996

[30] Foreign Application Priority Data

Sep. 16, 1994 [DK] Denmark .................. 1071/94

[51] Int. Cl.⁶ ............................................. A23D 7/00
[52] U.S. Cl. ................................. 426/42; 426/603
[58] Field of Search ........................... 426/34, 41, 42, 426/43, 603, 602

[56] References Cited

U.S. PATENT DOCUMENTS

| | | | |
|---|---|---|---|
| 4,107,334 | 8/1978 | Jolly | 426/657 |
| 4,477,472 | 10/1984 | Seto | 426/98 |
| 4,636,388 | 1/1987 | Lin | 426/7 |
| 4,847,097 | 7/1989 | Mellqvist | 426/42 |
| 4,981,704 | 1/1991 | Thibault | 426/656 |
| 5,021,248 | 6/1991 | Stark | 426/531 |
| 5,145,702 | 9/1992 | Stark | 426/531 |
| 5,330,778 | 7/1994 | Stark | 426/531 |

FOREIGN PATENT DOCUMENTS

| | | |
|---|---|---|
| 0473 854 | 11/1992 | European Pat. Off. . |
| 0474 299 | 11/1992 | European Pat. Off. . |
| WO 94/21133 | 9/1994 | WIPO . |

OTHER PUBLICATIONS

Abstract of Japan, vol. 14, No. 350 (C–744).
Abstract of Japan, vol. 8, No. 156 (C–234).
Motoki et al 1983 Crosslinking Between Different Food Proteins by Transglutaminase J Food Sci. 48:561.

*Primary Examiner*—Carolyn Paden
*Attorney, Agent, or Firm*—Steve T. Zelson, Esq.; Elias J. Lambiris, Esq.

[57] ABSTRACT

The present invention relates to a process of preparing a spread and the use of an enzyme in the production of a spread. The process of preparing a spread includes the following steps: a) the aqueous phase, which includes protein, is treated with an enzyme capable of enhancing the viscosity of the aqueous phase, b) the pH-value is adjusted to 4.8 to 6.0, c) the aqueous phase or emulsion is heated to between 60° C. and 100° C. for a period of time, d) the aqueous phase or the emulsion is tempered to a temperature between 30° C. and 50° C., e) the tempered aqueous phase is mixed with the fat phase and tempered to between 30° C. and 50° C. until an emulsion is formed, f) the emulsion is crystallized to form a spread. The steps in the process may be performed in the sequence steps a), b), c), d) e), f) or a), b), d), e), c), d), f).

19 Claims, No Drawings

PROCESS OF PREPARING A SPREAD

CROSS-REFERENCE TO RELATED APPLICATIONS

This application is a 35 U.S.C. 371 national application of PCT/DK95/00370 filed Sep. 15, 1995 and claims priority under 35 U.S.C. 119 of Danish application 1071/94 filed Sep. 16, 1994, the contents of which are fully incorporated herein by reference.

FIELD OF THE INVENTION

The present invention relates to a process of preparing a spread, said spread, and the use of (an) enzyme(s) in the production of a spread.

BACKGROUND OF THE INVENTION

Processes for industrial preparation of spreads have been well known for many years.

When using the term "spread" in this specification, it preferentially means "water-in-oil" emulsions, such as margarine, shortening and the like.

The terms "fat" and "oil" are used interchangeably.

The preparation of a spread such as margarine and shortening usually involves the following steps: (1) separately preparing a fat phase and an aqueous phase, (2) formulation, (3) solidifying and plasticizing the blend, (4) packaging, and (5) tempering, if needed (Aage Jart, Kompendium i fedtstofteknolo-gi, III. Nogle fedtholdige levnedsmidler 3. udgave/3. oplag, Den Kgl. Veterinær- og Landbohøjskole, København, 1982, page 240-242. From Gunstone, Lipids in Foods Chemistry, Biochemistry and Technology, Pergamon Press, 1983).

The "formulation" step is a preparation for step (3) and consists of vigorously mixing (i.e. churning) the aqueous phase and the fat phase. The mixing leads to the formation of an emulsion of small droplets of the aqueous phase dispersed in a continuous fat phase, i.e. water-in-oil emulsion. However, such emulsion, dependant on the rigidity of the fat, usually breaks down rapidly as the dispersed aqueous droplets coalesce. To avoid this, the emulsion stability is enhanced by the addition of emulsifying agents to the fat phase starting material. Examples of conventional emulsifying agents include egg yolk, soya lecithin, proteins, synthetic or semi-synthetic emulsifiers. Thus, a barrier to the coalescence of the droplets is formed.

Solidification and plasticizing are generally accomplished using scraper surface heat exchangers.

In this equipment a steel shaft rotates in a tube which is cooled externally by ammonia. Scraper blades on the rotating shaft, moving at high speeds, are pressed against the cooled inner surface by centrifugal force. The high internal pressure and shearing action cause fast nucleation and crystallization during the short residence time of a few seconds. Typically, the melted fat blend, plus optional ingredients, is chilled rapidly from 46°–49° C. to 16°–18° C. The supercooled melt is then pumped to a large diameter tube fitted with stator pins on the cylinder walls and a high speed rotating shaft equipped with rotor pins. This mechanically works the fat as it passes through the unit, the crystals growing and the mass partially solidifying.

The "working" extends the plastic range of the product. Inert gas (10–20%) or air may be added here and dispersed in the shortening as small bubbles to improve the whiteness of the product.

This may also contribute to creaming ability. The plastic mass is now pumped through a homogenizing valve and finally to package fillers. Containers may range in size from 0.45 kg to 172 kg drums.

When tempering is needed, the packaged product is normally held for 24–72 hours in a constant temperature room, usually at 5°– 15° C. During tempering, crystallization proceeds slowly and the crystal structure is stabilized against changes that might otherwise take place during subsequent temperature variations encountered during normal handling and storage.

Should the product, however, be warmed above the melting point of the lowest melting polymorphic form, the structure is lost and the product must be melted and reprocessed.

A method that can be used for avoiding separation of the emulsion or break down of the final spread is to add about 7–8 wt. % protein (in most cases milk proteins) to the aqueous phase. This stabilizes the spread by enhancing the viscosity of the aqueous phase.

However, the use of significant amounts of proteins are disadvantageous, as proteins are relatively expensive, difficult to handle, give the product a not wanted acrid taste and discolorates the spread.

In contrast hereto, a spread with no protein(s) in the aqueous phase has a bad mouthfeel and has no taste at all.

Therefore, to reduce the amount of protein(s) in the spread, the aqueous phase may alternatively comprise 2–3 wt. % protein(s) and about 2 wt. % hydrocolloid (usually gelatin).

Gelling polysaccharides may be used. However, the use of certain polysaccharides, such as alginate, agar and pectin, gives a bad mouthfeel, on the account of relatively slow break down in the mouth.

Compared to such polysaccharides gelatin gives a good mouthfeel, since it melts at mouth temperature, and further readily releases salt as well as water soluble additives such as flavour components.

EP 473 854 and EP 474 299 (Unilever) discloses water-in-oil dispersions containing from 5–65wt. % of a continuous fat phase and from 95–35 wt. % of an aqueous phase containing a viscosity enhancing gelling polysaccharide, such as agar, and from 0.004 to 10 wt. % protein, other than gelatin.

All the above mentioned additives known to successfully stabilize the final spread product are relatively expensive.

Low pH-values are advantageous in the context of obtaining good taste and good storage properties of the spread, due to the fact that spoilage by microorganisms, such as especially mould and bacteria, are limited. At low pH-values there is, however, a risk of precipitation of the present protein when heating an aqueous phase.

SUMMARY OF THE INVENTION

The object of the invention is to provide an improved process for preparing a spread or low-fat spread with a low or balanced content of protein(s), and without or with a reduced amount of further conventional viscosity enhancing agents.

According to the invention a process of preparing such spread involves mixing an aqueous phase, comprising protein(s), with a fat phase, which mixing comprise the following steps:

a) the aqueous phase comprising protein(s) is treated with an enzyme capable of enhancing the viscosity of the aqueous phase, b) the pH-value is adjusted to a value in the range from 4.8 to 6.0, c) the aqueous phase or the emulsion is heated to a temperature between 60° C. and 100° C. for a period of time, d) the aqueous phase or the emulsion is tempered to a temperature between 30° C. and 50° C., e) the tempered aqueous phase is mixed with the fat phase tempered to a temperature between 30° C. and 50° C. until an emulsion is formed, and f) the emulsion is crystallized to form a spread, characterized in that said process is performed in sequence step a)-b)-c)-d)-e)-f) or step a)-b)-d)-e)-c)-d)-f).

The enzyme used for treating the aqueous phase is preferably transglutaminases, and/or the Component C of Alcalase®, or variants thereof.

The invention also relates to a spread prepared by the process according to the invention.

The final aspect of the invention is to provide the use of enzymes for enhancing the viscosity of the aqueous phase of water-in-oil emulsions.

DETAILED DESCRIPTION OF THE INVENTION

It is the object of the invention to solve some of the above mentioned problems by providing a process for preparing a conventional spread or a low-fat spread with a low or balanced content of protein and without or with a reduced amount of hydrocolloids and polysaccharides to stabilize the product.

In is to be understood that it is essential that the quality of the prepared spread at least fulfils the quality requirements imposed on spread prepared by conventional processes.

The process must not be more cumbersome than conventional processes and it is important that it can be carried out using conventional production equipment.

It has now surprisingly been found that it is possible to provide a such process for preparing spread or low-fat spread that fulfil all of the above listed demands.

According to the invention the process of preparing a spread involves mixing an aqueous phase, comprising protein(s), with a fat phase, which mixing comprises the following steps:

a) the aqueous phase comprising protein(s) is treated with an enzyme capable of enhancing the viscosity of the aqueous phase, b) the pH-value is adjusted to a value in the range from 4.8 to 6.0, c) the aqueous phase or the emulsion is heated to a temperature between 60° C. and 100° C. for a period of time, d) the aqueous phase or the emulsion is tempered to a temperature between 30° C. and 50° C., e) the tempered aqueous phase is mixed with the fat phase tempered to a temperature between 30° C. and 50° C. until an emulsion is formed, f) the emulsion is crystallized to form a spread, characterized in that said process is performed in sequence step a)-b)-c)-d)-e)-f) or a)-b)-d)-e)-c)-d)-f).

When a spread is prepared following the step sequence a)-b)-c)-d)-e) the heating in step c) and tempering in step d) refers to the aqueous phase. In the case of following the step sequence a)-b)-d)-e)-c)-d)-f) the first tempering in step d) refers to the aqueous phase, while the heating in step c) and the second tempering in step d) refer to the emulsion, as the emulsion of the aqueous phase and the fat phase is formed in step e).

The treatment with enzymes takes place under conditions comprising a pH-value in the range of 5.5 to 7.0, and at a temperature between 20° C. and 60° C.

The process according to the invention render it possible to decrease the pH-value of the final spread to between 4.8 and 6.0.

This is advantageous and desirable, due to the antimicrobial effect of pH-values within this range. Consequently, it makes it possible to obtain a product having excellent storage properties, due to it being less sensitive to "spoiler" microorganisms, such as primarily mould and bacteria. The exclusion or inhibition of growth of microorganisms makes it possible to extend the storage period of the final spread product for a significant period of time.

Furthermore, it provides the spread with good organoleptic properties.

In a preferred embodiment of the invention the pH-value in step b) is adjusted to 5.0 to 5.2.

After adjusting the pH in step b), the aqueous phase is heated to between 70° C. and 90° C., especially about 85° C., for a period of between 1 minute and 10 hours, preferably between 30 minutes and 5 hours, especially between 45 minutes and 2 hours.

During this period the enhancement of the viscosity of the aqueous phase takes place, due to the previous treatment with an enzyme.

Suitable enzymes, used for gelling the aqueous phase, according to the invention, are transglutaminases (Protein-glutamine γ-glutamyltransferase, (E.C. 2.3.2.13, Enzyme Nomenclature, Academic Press, Inc., 1992).

Transglutaminases are enzymes capable of catalyzing an acyl transfer reaction in which a gamma-carboxyamide group of a peptide-bound glutamine residue is the acyl donor. Primary amino groups in a variety of compounds may function as acyl acceptors with the subsequent formation of monosubstituted gamma-amides of peptide-bound glutamic acid. When the epsilonamino group of a lysine residue in a peptide-chain serves as the acyl acceptor, the transglutaminases form intramolecular or intermolecular gamma-glutamyl-epsilon-lysyl crosslinks.

A wide array of transglutaminases have been identified and characterized from a number of animals and a few plant species.

The most widely used animal derived transglutaminase, Factor XIIIa, is a multi-subunit enzyme.

The transglutaminases may, according to the invention, be of e.g. mammalian origin, such as of human or bovine origin, or microbial origin, or variants thereof.

In a specific embodiment of the invention the transglutaminase is Factor XIIIa of human origin.

Transglutaminases of microbial origin are preferred in cases where the transglutaminase treatment of the aqueous phase takes place under conditions, where the pH-value is below about 6.6, preferentially between 5.5 and 6.6, at temperatures significantly higher than 37° C., preferably from about 40°–60° C.

A specific embodiment the transglutaminase is a microbial transglutaminase derived from *Streptomyces libani*, or variants thereof. Said microbial transglutaminase is available from Novo Nordisk A/S.

Other microbial transglutaminases have been described, including a transglutaminase from *Physarum polycephalum* (Klein et al., Journal of Bacteriology, Vol. 174, pages 2599–2605), as well as transglutaminases from *Streptover-* ticillium mobaraense, Streptoverticillium cinnamoneum, and Streptoverticillium griseocarneum (Motoki et al., U.S. Pat. No. 5,156,956), and from Streptomyces lavendulae (Andou et al., U.S. Pat. No. 5,252,469).

Further contemplated are transglutaminases described in the pending DK patent application no. 990/94 (Novo Nordisk A/S).

The "component C" of Alcalase® is characterized in U.S. Pat. No. 4,266,031 (Novo Nordisk A/S) as a contaminant of Subtilisin A produced by Bacillus licheniformis. The "component C" from Alcalase® is available from Novo Nordisk A/S. Also contemplated, according to the invention, are variants of the "component C".

Such variants may be produced by site directed or cassette mutagenesis as described in e.g. EP 130.756 (Genencor) or EP 479.870 (Novo Nordisk A/S); or by random mutagenesis by using methods well established in the art.

The critical concentration of the enzyme, in the context of the gelling effect, is dependant on the presence of other ingredients exhibiting gelling properties, such as the protein (s). To fulfil demands to conventional products and to obtain a suitably enhanced viscosity, the purified enzyme protein must in general be present in the aqueous phase in a concentration of 0.01wt. % to 1.0 wt. %, preferably of 0.05 wt. % to 0.4 wt. %, calculated on the basis of the protein content in the spread.

The aqueous phase comprises protein(s) in an amount of between 0.01–6.0 wt. %, preferably between 0.1–4.0 wt. %, especially between 1.0–3.0 wt. %, calculated on the basis of the final spread product.

Suitable protein(s) are animal and non-animal derived protein, such as skim milk powder from milk, caseinate, whey protein from milk, soy protein, pea protein, or mixtures thereof.

Due to large consumer groups, such as vegetarians, which do not eat products containing animal derived ingredients, it may in some cases be advantageous to prepare the spread without using ingredients originating from animals, such as e.g. gelatin, which is derived from pig or bovine skin.

After the gelling of the aqueous phase it is tempered to a temperature between 20° C. and 50° C., preferably about 45° C., and is then mixed vigorously with the fat phase, heated to about the same temperature as the aqueous phase, to form a water-in-oil emulsion.

The step e) is succeeded by a crystallisation step f) to form a spread. The crystallisation may obtained in any suitable way, e.g. by using a scrape surface heat exchanger or a tube chiller, which is described above.

Finally the spread product may be packaged by any methods described in the art.

By preparing the spread product, according to the process of the invention, the spread is provided with good organoleptic properties and a good mouthfeel. Further, the spread is less expensive to prepare, primarily due to the reduced cost of additives and proteins for stabilizing the emulsion.

Another advantage of the invention is that the use of hydrocolloids can be excluded, which makes the spread more acceptable for certain people.

Even though a variety of spread can be prepared, the invention preferentially relates to spread, which consist of between 10–80 wt. %, preferably 25–60 wt. %, especially 35–50 wt. % fat phase, and of between 20–90 wt. %, preferably between 40–75 wt. %, especially between 50–65 wt. % aqueous phase based on the composition of the final spread product.

The composition of the fat phase is dependent on the specific spread to be prepared, but may comprise any edible fatty substance. Primarily contemplated are natural or synthesized fats and oils consisting essentially of triglycerides, such as soy bean oil, sunflower oil, palm oil, and coconut oil, but very much also animal originated fats, such as fish oil, lard and tallow.

The fats may have been partially or completely hydrogenated, or modified otherwise. Specific examples of suitable oils are soy bean oil (41° C.), which has been hydrogenated to 41° C., or coconut oil (26° C.) hydrogenated to 26° C.

Further contemplated are non-toxic fatty materials having properties similar to triglycerides, which materials may be indigestible, such as for examples vaxes, e.g. jojoba oil and hydrogenated jojoba oil, and polyol fatty acid polyesters. The term "polyol" is intended to refer to any aliphatic or aromatic compound which comprises at least four free hydroxyl groups. Contemplated are also sugar polyols, which comprises sugars, i.e. the mono-, di- and oligosaccharides, the corresponding sugar alcohols and the derivatives thereof having at least four free hydroxyl groups. Examples of sugar polyols include glucose, mannose, galactose, xylose, fructose, sorbose, tagatose, ribulose, xylulose, maltose, lactose, cellobiose, raffinose, sucrose, erythritol, mannitol, lactiol, sorbitol, xylitol and α-methylglucoside.

According to the invention the aqueous phase and/or the fat phase may have added other conventional additives used in the preparation of spread, such as emulsifying agents, colorants, or flavour components.

Suitable conventional additives are e.g. mono-glycerides as emulsifying agent and β-carotene which is a colorant.

The invention also relates to a spread prepared according to the process of the invention.

In a preferred embodiment the spread is a low-fat spread, having a fat content of about 10 to 40 wt. %.

Finally, it is the object of the invention to provide the use of enzymes for gelling emulsions comprising a fat and an aqueous phase, comprising protein(s) by enhancing the viscosity of the aqueous phase.

The protein is present in the aqueous phase in an amount of between 0.01–6.0wt. %. preferably 0.1–4.0wt. %, especially 1.0–3.0 wt. % of the final spread product.

Specific enzymes are transglutaminases and the component C of Alcalase®, or variants thereof. The enzyme(s) may be used according to the process of the invention to produce a spread of the invention.

METHODS AND MATERIALS

Enzyme

Transglutaminase, Factor XIIIa, 8 mg enzyme protein per gram purified enzyme product. (Available from Novo Nordisk A/S)

Aqueous phase (Example 1 and 2)

3.0% Skim milk powder having a protein content of 33 wt. %.

2.0% Sodium-caseinate having a protein content of 85 wt. %.

0.2% Kalium-sorbate 0.3% NaCl 0.1% $CaCl_2$ 53.6% Water 0.018% Transglutaminase, Factor XIIIa enzyme protein Fat phase (Example 1 and 2)

1.0% Soy bean oil hydrogenated to 41° C.

3.0% Coconut oil hydrogenated to 26° C.

6.0% Soy oil 0.6% Mono-glyceride (Palsgaard 0291)

0.03% β-carotene (BC-013-WSS) (Chr. Hansen's lab. Denmark A/S)

Equipment

Tube chiller (Schröder)

Kombinator with 3 chilling tubes and 2 pin rotor machines (Scröder)

Methods

Preparation of an aqueous phase

Tap water is heated to about 25° C., and sodium caseinate is added under vigorous agitation. The dispersion is heated to about 60° C. and left until all sodium caseinate is completely dissolved.

Skim milk powder and $CaCl_2$ is added to cold tap water under agitation and left for about 20 minutes for rehydration. When the two solutions are homogeneous they are mixed with NaCl in a reaction vessel with heating jackets. The pH is adjusted to 7.0 with NaOH.

Preparation of the transglutaminase solution

A transglutaminase solution is prepared under agitation by dissolving 1 part activated transglutaminase in 5 parts water at room temperature for one hour.

Preparation of the fat phase

A fat phase is prepared by mixing soy bean oil, coconut oil and soy oil. An emulsifier is melted with the fat phase and stirred into the total fat phase. A colorant is added and the fat phase.

In the following the invention will be illustrated by specific examples.

EXAMPLES

EXAMPLE 1

Preparing a spread (following in sequence step a)-b)-c)-d)-e)-f).)

A spread having a fat content of about 40 wt. % and a protein content of about 2.7wt. %, calculated on the basis of the final spread product, was prepared as described below.

Preparation of the aqueous phase I 30 parts skim milk powder, 20 parts sodium caseinate and 1 part $CaCl_2$ was suspended in water at 25° C., as described above in the Methods and Materials section, giving a protein concentration of about 8.5 wt. %. The solution was then mixed and the pH was adjusted to 7.0, using 0.1M NaOH. The solution was left at 5° C. over night.

Transglutaminase treatment of the aqueous phase

The aqueous phase was then subjected to transglutaminase by addition of the transglutaminase solution prepared as described above, until the protein concentration was about 7.0wt. %. The transglutaminase treatment took place at 37° C., pH 7.0, under mild agitation for a period of 45 minutes (step a)).

Gelling of the aqueous phase

After the transglutaminase treatment the pH was adjusted to about 5.2, using HCl (step b)). The remaining water, NaCl and Kalium sorbate, were added, leading to a protein concentration of 4.5 wt. %.

The gelling of the aqueous phase took place at 80° C. for a period of 60 minutes (step c)). The gelled aqueous solution was the tempered to a temperature of 42° C. (step d)).

Preparation of the fat phase

The fat phase was prepared by mixing 11 parts soy bean oil (41° C.), 3 parts coconut oil (26° C.) and 26 parts soy oil. 1 part mono-glyceride was melted with 5 parts of the fat phase, and stirred into the total fat phase. β-carotene was added and the fat phase and tempered to 45° C.

Emulsification

The aqueous phase was added slowly to the fat phase under good agitation, avoiding too much air in the emulsion, and a water-in oil emulsion was formed. The emulsion was then tempered to a temperature of 42° C. (step e)).

Crystallisation

The water-in-oil emulsion was pasteurized and crystallized in a tube chiller. The outlet temperature of the spread product was about 15° C. (step f)).

Maturation

The spread product was set for maturation (recrystallization) at 5° C. for 2 days.

Assessment of the prepared spread

The spread was found to have good organoleptic properties and a good mouthfeel.

EXAMPLE 2 preparing a spread (following in sequence step a)-b)-d)-e)-c)-d)-f))

A spread having a fat content of about 40 wt. % and a protein content of about 2.7 wt. % calculated on the basis of the final spread product was prepared as described below.

An aqueous phase, a transglutaminase solution and a fat phase identical to the ones used in Example 1 were used for the following process.

Transglutaminase treatment of the aqueous phase

The aqueous phase (comprising milk 8.5 wt. % proteins) was tempered to 37° C. and the transglutaminase solution was added under agitation and reacted for 45 minutes (step a)).

Emulsification

After transglutaminase treatment the pH was adjusted to pH 5.2 with HCl (step b)). The resulting aqueous phase and the prepared fat phase were tempered to 47° C. (step d)) under agitation and mixed by slowly pumping the aqueous phase into the fat phase. An emulsion was formed under agitation and recirculation of the emulsion over an external pump (step e)).

Pasteurisation

The emulsion was pasteurised in a scrapped surface heat exchanger at 85° C. with a 3 minutes holding time (step c)). Hereafter the emulsion was cooling tempered to 43° C. (step d)).

Crystallization

The formed emulsion was crystallized in a Scröder Kombinator with 3 chiller tubes and 2 pin rotor machines. The inlet temperature was about 43° C. and the outlet temperature of the last pin rotor machine was about 15° C. (step f)).

Assessment of the prepared spread

The prepared spread had a bright yellow colour and was stable and homogeneous when spread.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A process of preparing a spread, wherein a water phase comprising protein(s) is mixed with a fat phase, comprising the following steps:

a) treating the aqueous phase comprising protein(s) with an enzyme capable of enhancing the viscosity of the aqueous phase, b) adjusting the pH-value to a value in the range from 4.8 to 6.0, c) heating the aqueous phase or the emulsion to a temperature between 60° C. and 100° C. for a period of time, d) tempering the aqueous phase or the emulsion to a temperature between 30° C. and 50° C., e) mixing the tempered aqueous phase with the fat phase tempered to a temperature between 30° C. and 50° C. until an emulsion is formed, f) crystallizing the emulsion to form a spread, characterized in that said process is performed in step sequence a)-b)-c)-d)-e)-f) or a)-b)-d)-e)-c)-d)-f).

2. The process according to claim 1, wherein the aqueous phase in step a) is treated with enzyme under conditions comprising a pH-value in the range of 5.5 to 7.0, and at a temperature of between 20° C. and 60° C.

3. The process according to claim 1, wherein the pH-value in step b) is adjusted to a value in the range from 5.0 to 5.2.

4. The process according to claim 1, wherein the aqueous phase or the emulsion in step c) is heated to a temperature between 70° C. and 90° C. for a period of between 1 minute and 10 hours.

5. The process according claim 1, wherein the crystallisation in step f) is performed using a tube chiller or a Kombinator.

6. The process according to claim 1, wherein the protein is present in the aqueous phase in an amount of between 0.01–6.0 wt. % of the final spread product.

7. The process according to claim 6, wherein the protein is skim milk powder from milk, caseinate, whey protein from milk, soy protein, pea protein, or mixtures thereof.

8. The process according to claim 1, wherein the enzyme used for treating the aqueous phase is transglutaminase of mammalian origin, or variants thereof.

9. The process according to claim 8, wherein said mammalian transglutaminase is of human or bovine origin.

10. The process according to claim 9, wherein the transglutaminase is Factor XIIIa of human origin.

11. The process according to claim 8, wherein the purified enzyme protein for treating the aqueous phase is present in a concentration of 0.01 wt. % to 1.0 wt. % calculated on the basis of the protein content in the spread.

12. The process according to claim 1, wherein the enzyme used for treating the aqueous phase is transglutaminase of microbial origin, or variants thereof.

13. The process according to claim 12, wherein said microbial enzyme is a transglutaminase of bacterial origin.

14. The process according to claim 13, wherein said bacterial transglutaminase is derived from *Streptomyces libani*.

15. The process according to claim 1, wherein the enzyme for treating the aqueous phase is the component C, produced by *Bacillus licheniformis*, or variants thereof.

16. The process according to claim 1, wherein the fat phase constitutes between 10–80 wt. % and the aqueous phase constitutes between 20–90 wt. % of the final spread product.

17. The process according to claim 1, wherein the aqueous phase and/or the fat phase is treated with other conventional additives used in the production of spreads, selected from the group consisting of emulsifying agent, colorants, flavour components, and hydrocolloids in a reduced amount.

18. A spread product produced according to the process of claim 1.

19. The spread product according to claim 18, being a low-fat spread, having a fat content of between 10 and 40 wt. %.

* * * * *